US006935890B1

(12) United States Patent
Gretz

(10) Patent No.: US 6,935,890 B1
(45) Date of Patent: Aug. 30, 2005

(54) ELECTRICAL CONNECTOR

(76) Inventor: Thomas J. Gretz, 1102 Oakmont Rd., Clarks Summit, PA (US) 18411

( * ) Notice: Subject to any disclaimer, the term of this patent is extended or adjusted under 35 U.S.C. 154(b) by 37 days.

(21) Appl. No.: 10/700,238

(22) Filed: Nov. 3, 2003

Related U.S. Application Data

(63) Continuation of application No. 10/115,316, filed on Mar. 28, 2002, now Pat. No. 6,642,451, which is a continuation-in-part of application No. 10/017,537, filed on Oct. 22, 2001, now Pat. No. 6,616,194, and a continuation-in-part of application No. 10/034,156, filed on Dec. 26, 2001, now Pat. No. 6,538,201.

(51) Int. Cl.[7] .......................................... H01R 13/79
(52) U.S. Cl. .................................................... 439/552
(58) Field of Search ................................ 439/552, 551, 439/460; 174/65 R, 51, 65 SS; 285/162, 285/206, 151.1, 319, 249

(56) References Cited

U.S. PATENT DOCUMENTS

| 5,068,496 | A | * | 11/1991 | Favalora .................... 174/65 R |
| 5,072,072 | A | * | 12/1991 | Bawa et al. ............. 174/65 SS |
| 5,087,795 | A | * | 2/1992 | Guginsky ................ 174/65 SS |
| 5,266,050 | A | * | 11/1993 | O'Neil et al. ................ 439/552 |
| 5,831,217 | A | * | 11/1998 | Jarvis et al. ............. 174/153 R |
| 5,857,865 | A | * | 1/1999 | Shimirak et al. ........... 439/277 |
| 6,114,630 | A | * | 9/2000 | Gretz ........................ 174/65 R |

* cited by examiner

Primary Examiner—Alexander Gilman

(57) ABSTRACT

An improved liquid-tight connector that simplifies and vastly reduces the time and effort in securing non-metallic or metallic conduit to panels, junction boxes, or similar devices. The connector does not require a nut to secure its leading end to a panel or a compression nut to secure its trailing end to a conduit as is typically required with conventional liquid-tight connectors. The need to tighten nuts by hand or with hand tools is therefore eliminated. The connector allows connection of conduit to panels without the need to disassemble a portion of the connector and then reassemble again as in many prior art devices. The connector allows an installer to create a liquid-tight connection between a conduit and a panel by simply pushing a conduit into the trailing end of the connector and pushing the leading end of the connector into an aperture in the panel. Liquid-tight seals are created between the conduit and the connector and between the connector and the panel. By proper selection of the material of construction, the connector may be designed for use with either metallic or non-metallic conduit. If desired, a snap locking ring may be removed from the leading end of the connector to allow it to be screwed into a threaded access hole, or to be connected to a smooth access hole in the panel with a lock nut, similar to a conventional fitting.

3 Claims, 9 Drawing Sheets

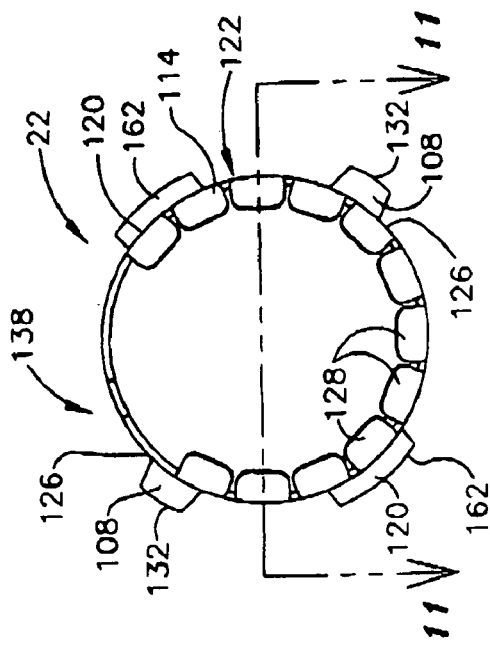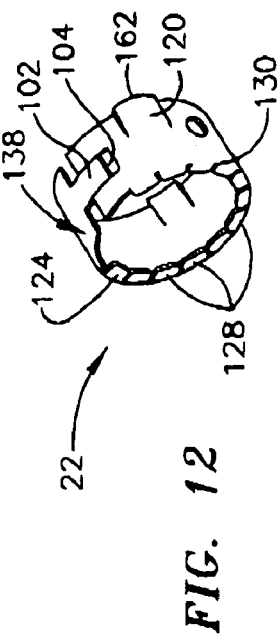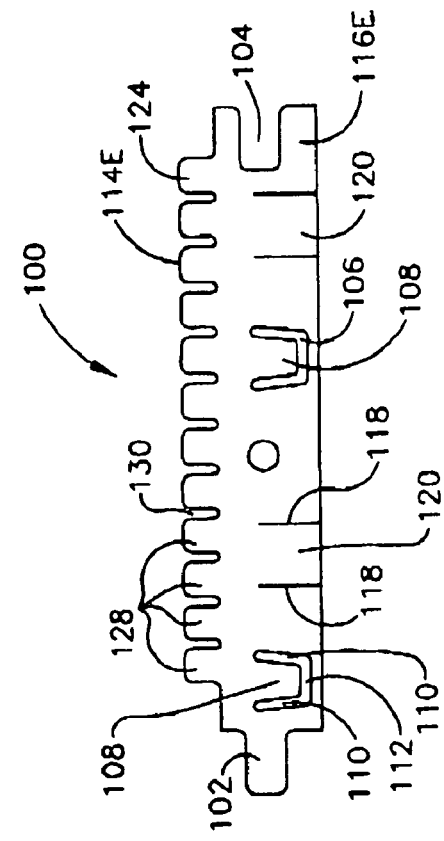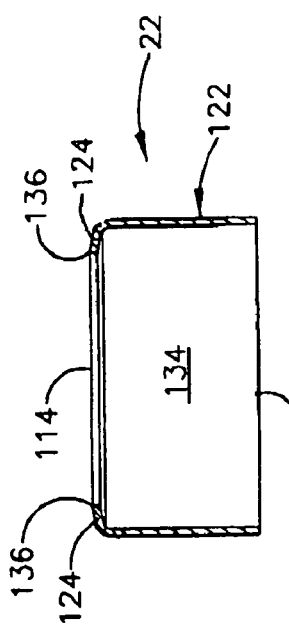
FIG. 9
FIG. 10
FIG. 11
FIG. 12

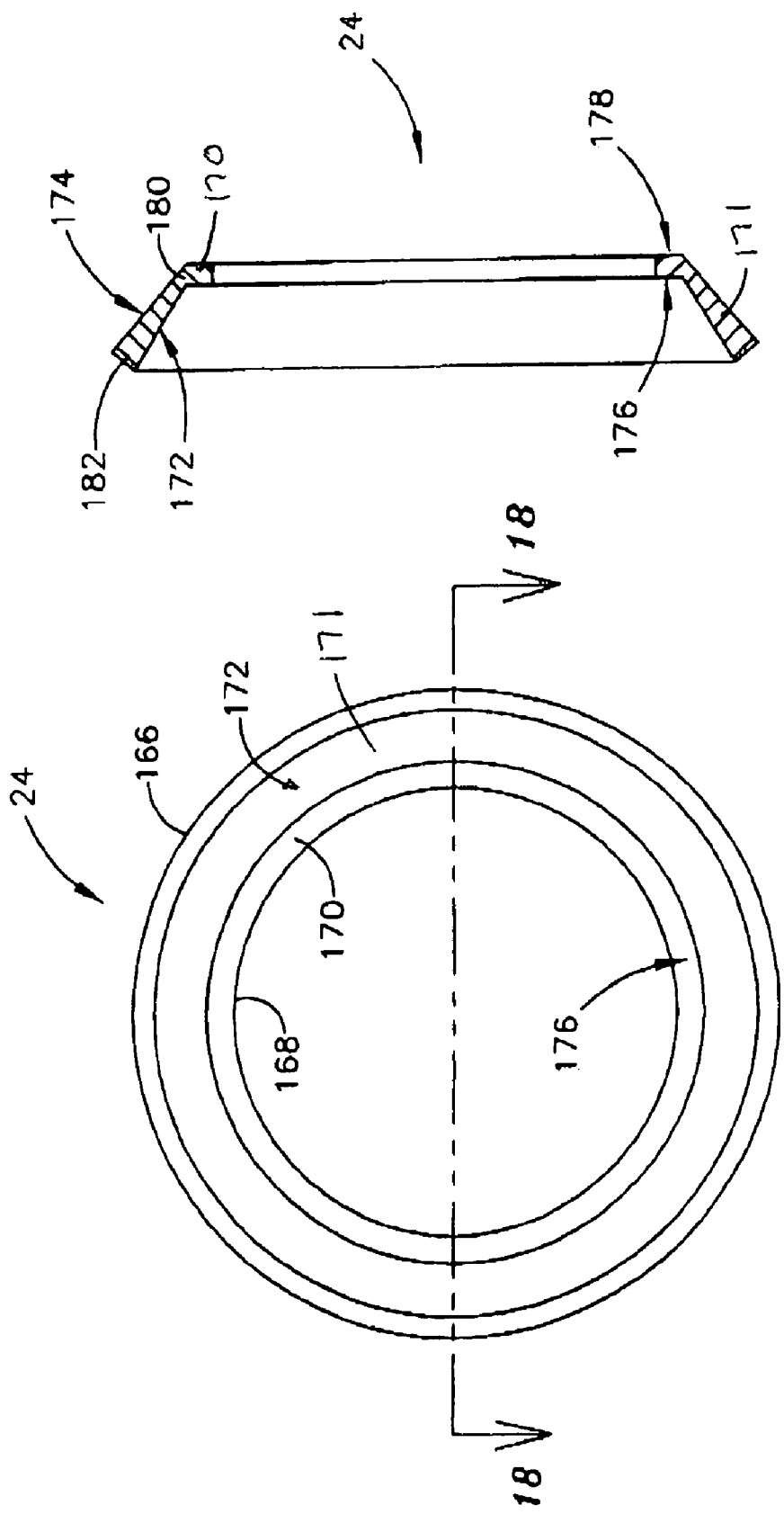

ELECTRICAL CONNECTOR

This application is a Continuation of U.S. patent application Ser. No. 10/115,316 entitled "Electrical Connector", filed Mar. 28, 2002 now U.S. Pat. No. 6,642,451 and which is a Continuation-In-Part of U.S. patent application Ser. No. 10/017,537 entitled "Liquid-tight Connector", filed Oct. 22, 2001 and now U.S. Pat. No. 6,616,194 and also a Continuation-In-Part of U.S. patent application Ser. No. 10/034,156 entitled "Threaded Snap In Connector", filed Dec. 26, 2001 and now U.S. Pat. No. 6,538,201, all of which are referred to herein and incorporated by reference.

FIELD OF THE INVENTION

The present invention relates to devices for connecting electrical tubing or conduit to electrical panels or junction boxes and specifically to a device that is liquid-tight, adaptable for snap-in or threaded connection to a panel, and easier to use than current connectors that are commonly used in the trade.

BACKGROUND OF THE INVENTION

Liquid-tight connectors are commonly used in the electrical industry for providing a liquid-tight connection between electrical conduit and panels or junction boxes. These connectors are usually multi-piece devices in which a portion must be dismantled to fit the conduit into the fitting and then reassembled to secure the conduit. Most of these prior art fittings require the use of a hand tool to tighten a nut sufficiently to achieve a liquid-tight connection between the conduit and the connector. Most prior art liquid-tight connectors also require the tightening of a nut on the leading end of the fitting to achieve a liquid-tight connection between the fitting and the panel or junction box.

For example, U.S. Pat. No. 4,900,068 to Law, granted Feb. 13, 1990 (hereinafter the '068 patent) claims a liquid-tight connector that accepts a non-metallic conduit that is grasped by fingers on a clip grasping above an annular ring on a ferrule. To fit the conduit into the liquid-tight connector of the '068 patent, the installer must insert the conduit into the fitting, and then tighten a compression nut with a hand tool such as a wrench to close the fingers on the clip and thereby achieve a liquid-tight fit. The leading end of the fitting is threaded and must be inserted into the knock-out of a panel or box, a nut is screwed onto the threaded end, and then a hand tool is typically used to secure the fitting to the panel or box. A hand tool therefore is typically employed to achieve a secure liquid-tight fit on both the trailing end of the fitting, between the conduit and the fitting, and on the leading end of the fitting, between the fitting and the panel or box.

U.S. Pat. No. 5,072,072 granted to Bawa, et al., on Dec. 10, 1991 (hereinafter the '072 patent) attempts to improve upon the fitting provided in the '068 patent by providing a fitting that requires minimal torque on a gland nut to secure the conduit to the trailing end of the fitting. The gland nut must be removed from the connector body and then is inserted over an electrical conduit with the outer surface of the conduit being received through the centrally located bore of the gland nut. The conduit is then pushed onto a ferrule. Upon tightening of the gland nut on the connector body claimed by the '072 patent, the gland nut engages resilient fingers with minimal friction loss, thereby enhancing hand tightening or minimizing the torque required with a tightening tool. The '072 patent therefore requires the separate operation of tightening a nut either by hand or with a tightening tool. The leading end of the fitting in the '072 patent is typically threaded and requires the use of a nut and an O-ring to secure the fitting to the panel and achieve a liquid-tight fit.

Therefore, as described above, the disadvantages of existing art liquid-tight connectors for connecting conduit to panels include:

(a) The connector includes from two to five separate pieces, some of which must be partially or completely disassembled at the jobsite prior to insertion of the conduit and then reassembled after the conduit is inserted into the trailing end.

(b) Prior art liquid-tight connectors for conduit typically includes a compression, gland, or other nut that must be tightened by hand or by a tightening tool to achieve a liquid-tight connection on the trailing end between the conduit and the connector.

(c) The leading end of prior art liquid-tight connectors for electrical conduit typically require the use of a nut that must be tightened with a hand tool to achieve a liquid-tight fit between the connector and the panel.

(d) A separate sealing ring or O-ring is typically provided with prior art liquid-tight conduit connectors and must be assembled onto the leading end of the connector prior to insertion of the leading end into the knock-out on a panel or box.

SUMMARY OF THE INVENTION

The present invention combines the advantages of the improved liquid-tight connector of U.S. patent application Ser. No. 10/017,537, filed Oct. 22, 2001 with the advantages of the threaded snap in connector of U.S. patent application Ser. No. 10/034,156, filed Dec. 26, 2001. Both of these references are incorporated herein by reference. U.S. patent Ser. No. 10/017,537 provided a liquid-tight connector assembly that may be simply installed by pushing a conduit into a channel on the trailing end of the connector and then pushing the leading end of the connector into a knock-out in a panel until outward projecting tangs on an annular steel spring adapter snap into place and create a liquid-tight fit. The steel spring adapter required that the leading end of the connector be threaded. U.S. patent Ser. No. 10/034,156 provided an improved connector with a threaded leading end and an improved snap ring that could be fitted on the leading end of the connector to provide a quick snap-tight connection to a knockout in a panel or could be removed to allow the connector to be screwed into a threaded access hole in a panel. The present invention therefore combines the versatility of the improved snap ring with the easy-insertion liquid-tight connector.

The present invention is an assembly of parts that is provided as a one-piece connector for achieving a liquid-tight seal between a non-metallic or metallic conduit and an electrical panel or box. The connector includes a tubular body with an axial bore there through and a centrally located flange dividing it into two ends including a leading end having threads on its exterior surface and a trailing end having an extending ferrule. A snap ring and a sealing ring are included on the leading end. Inward facing tabs on the leading end of the snap ring fit into a depression of the leading end of the connector thereby securing the snap ring to the connector. The trailing end of the connector accommodates a tubular retainer body and a tubular retainer body cover. The connector is an assembly of the separate pieces, none of which need to be disassembled when placed in use.

The retainer body is held around the ferrule or trailing end by the retainer body cover that is screwed onto a threaded shoulder extending from the central flange. The sealing ring is held on the leading end of the connector by outward projecting grounding tangs on the snap ring. The connector assembly has the advantages of providing a one-piece connector assembly which may be simply installed by pushing a conduit into a channel on the trailing end of the connector and then pushing the leading end of the connector into a knock-out in a panel or junction box until the outward projecting tangs on the steel adapter snap into place to engage the wall of the panel or box. The connector therefore is a significant labor saving device over prior art liquid-tight conduit connectors as disassembly of parts is not required and hand or tool tightening of nuts is not required on either the leading or trailing end. If it is desired to connect a conduit to a panel through a threaded access hole, the snap ring may be easily removed and the connector may be secured by screwing the leading end into the threaded hole.

Other advantages of the present invention will be better understood from the following descriptions when read in conjunction with the appropriate drawings.

DESCRIPTION OF THE DRAWINGS

FIG. 9 is a plan view of the blank used to form the snap ring of the present invention.

FIG. 10 is an end view of the annular snap ring formed from the blank shown in FIG. 9.

FIG. 11 is a sectional view taken on section 11—11 of FIG. 10.

FIG. 12 is a perspective view of the annular snap ring of FIG. 11 with the trailing end on the right.

FIG. 17 is a plan view of a preferred embodiment of the sealing ring used to achieve a liquid-tight seal between the leading end of the connector and a panel or junction box.

FIG. 18 is a sectional view taken on section 18—18 of the sealing ring shown in FIG. 17.

| Table of Nomenclature | |
|---|---|
| Part No. | Part Description |
| 20 | liquid-tight connector |
| 22 | snap ring |
| 24 | sealing ring |
| 26 | tubular body |
| 28 | retainer body |
| 30 | retainer body cover |
| 32 | flange |
| 34 | leading end (of tubular body) |
| 36 | trailing end (of tubular body) |
| 38 | ferrule |
| 40 | trailing wall (of flange) |
| 42 | shoulder |
| 44 | threads (on shoulder) |
| 46 | end (of ferrule) |
| 48 | base (of ferrule) |
| 50 | nose portion |
| 54 | depression |
| 56 | leading edge (of nose portion) |
| 58 | threads (on exterior of nose portion) |
| 60 | hex surface |
| 62 | leading side wall |
| 64 | trailing side wall |
| 66 | bottom |
| 68 | leading end of retainer body cover |
| 70 | trailing end of retainer body cover |
| 72 | lip (on retainer body cover) |
| 74 | leading end (of retainer body) |
| 76 | trailing end (of retainer body) |
| 78 | U-shaped cuts |
| 80 | inward and forward extending conduit tangs |
| 82 | central bore (of retainer body) |
| 84 | necked-down portion (of retainer body) |
| 86 | wall (of retainer body) |
| 88 | interior threads (on retainer body cover) |
| 90 | free end of conduit tangs |
| 92 | channel |
| 94 | seat |
| 96 | trailing wall of shoulder |
| 100 | blank |
| 102 | tongue |
| 104 | groove |
| 106 | U-shaped openings |
| 108 | snap locking tangs |
| 110 | wide slots |
| 112 | shear line |
| 114e | first edge of blank |
| 114 | leading end of snap ring |
| 116e | second edge of blank |
| 116 | trailing end of snap ring |
| 118 | slits |
| 120 | grounding tangs |
| 122 | outer circumference (of snap ring) |
| 124 | locking tab (of snap ring) |
| 126 | face |
| 128 | locking tab segments |
| 130 | space between segments |
| 132 | abutment or outer edges (of snap locking tangs) |
| 134 | inner circumference of snap ring |
| 136 | inner edges of locking tab |
| 138 | area free of segments |
| 140 | junction box |
| 142 | knockout or access hole |
| 144 | leading end of connector |
| 146 | trailing end of connector |
| 148 | conduit |
| 150 | junction box wall |
| 152 | leading wall of flange |
| 154 | outer surface of junction box wall |

-continued

Table of Nomenclature

| Part No. | Part Description |
| --- | --- |
| 156 | inner surface of junction box wall |
| 158 | end of conduit |
| 160 | side walls of access hole |
| 162 | grounding edge (of grounding tang) |
| 164 | central axis |
| 166 | outer edge of sealing ring |
| 168 | inner edge of sealing ring |
| 170 | base portion of sealing ring |
| 171 | outer portion of sealing ring |
| 172 | leading face of outer portion |
| 174 | trailing face of outer portion |
| 176 | leading face of base portion |
| 178 | trailing face of base portion |
| 180 | base thickness |
| 182 | outer thickness |
| 184 | second embodiment of liquid-tight connector |
| 186 | smooth outer periphery (of nose portion) |

DESCRIPTION OF THE INVENTION

Figure 13:
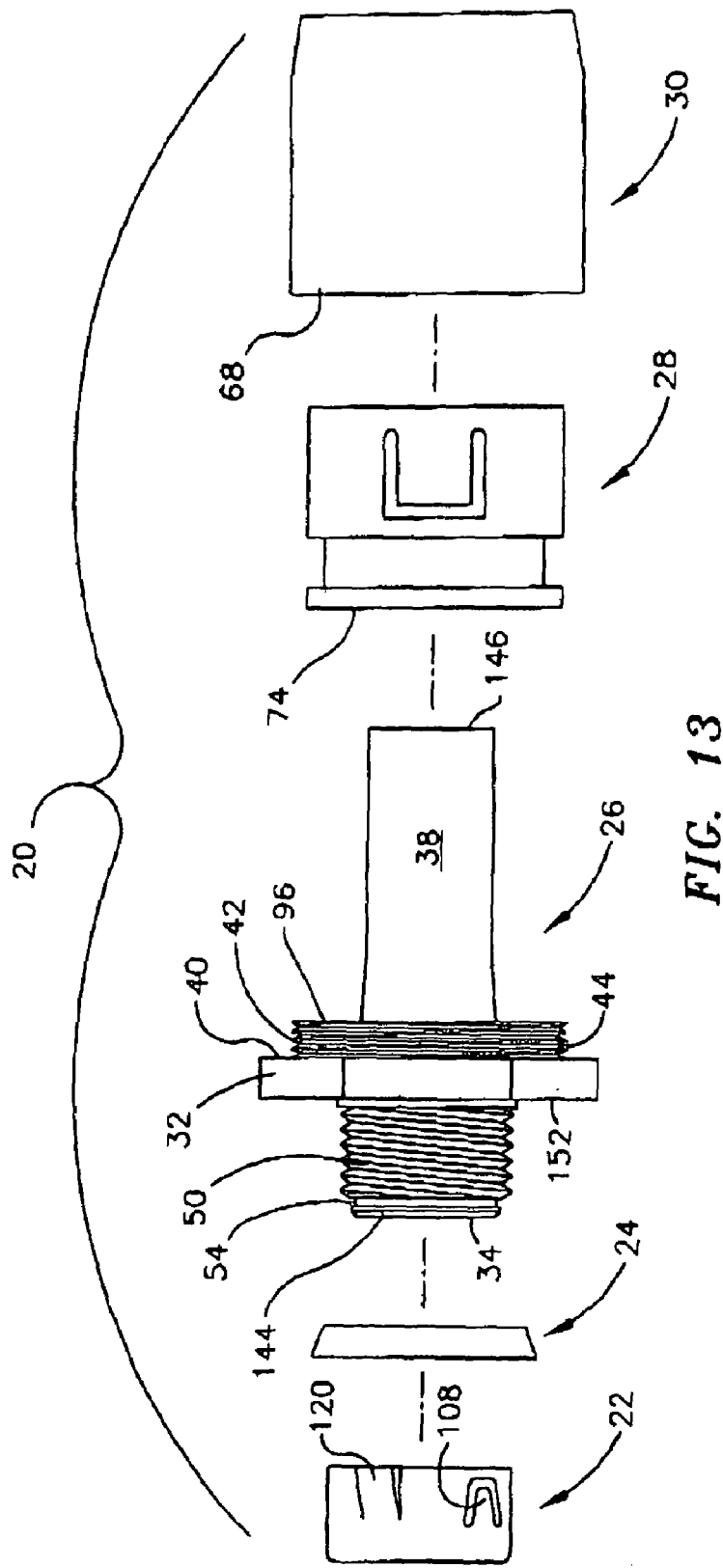
FIG. 13 is a exploded view showing the five portions of the preferred embodiment as they will be aligned prior to assemblage to form the liquid-tight connector of the present invention and including, from left to right, the snap ring, the Santoprene sealing ring, the tubular body, the retainer body and the retainer body cover.

According a preferred embodiment of the present invention, five separate pieces are assembled as shown in FIG. 13 to form the preferred embodiment of the liquid-tight connector 20. The five pieces include, from left to right, the snap ring 22, sealing ring 24, tubular body 26, retainer body 28, and retainer body cover 30.

Figure 1:
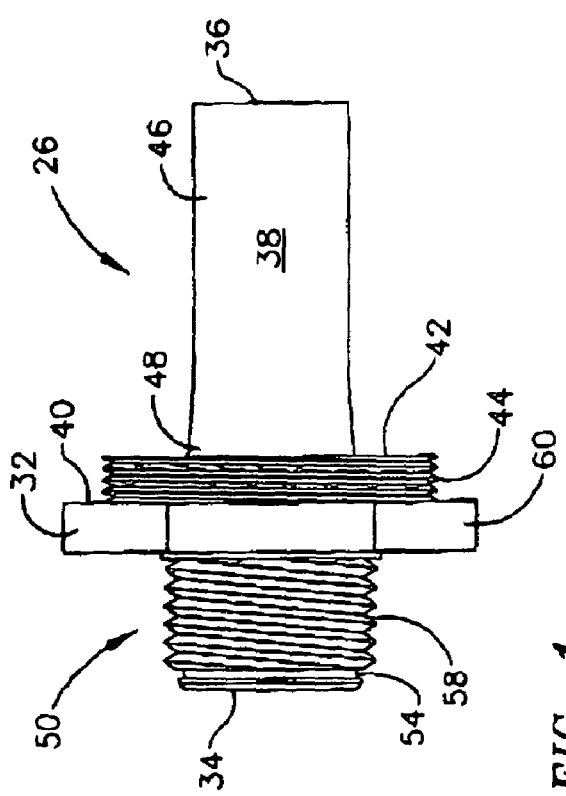
FIG. 1 is a plan view of the tubular body of the liquid-tight connector of the present invention.

With reference to FIG. 1, a plan view of the tubular body 26 depicts a flange 32 dividing the tubular body 26 into a leading end 34 and a trailing end 36. The ends of the tubular body 26 are labeled according to the direction they will eventually face when used in conjunction with a junction box or panel, with the leading end 34 being the end facing the panel and the trailing end 36 away from the panel. The trailing end 36 consists of a ferrule 38 extending from the trailing wall 40 of the flange. Also extending from the trailing wall 40 of the flange 32 is a shoulder 42 concentric with the ferrule 38. The outer surface of the shoulder contains threads 44. The ferrule 38 is narrow at its end 46 and tapers outward to a wider diameter near its base 48 toward the junction with the flange 32. The leading end 34 of the tubular body 26 includes a tubular nose portion 50 with a depression 54 near its leading edge 56 and a threads 58 on its exterior surface. The exterior periphery of the flange has a hex surface 60.

Figure 2:
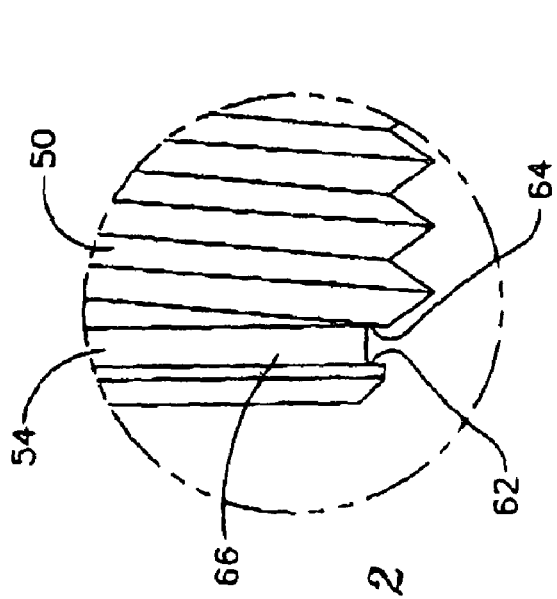
FIG. 2 is a detailed view of a corner of the leading end portion of the tubular body of FIG. 1.

Referring now to FIG. 2, a detailed view of a corner of the leading end portion of the tubular body 26 shows the depression 54 in greater detail. The depression 54 is composed of a leading side wall 62, a trailing side wall 64, and a bottom 66 that encircles the entire periphery of the nose portion 50.

Figure 4:
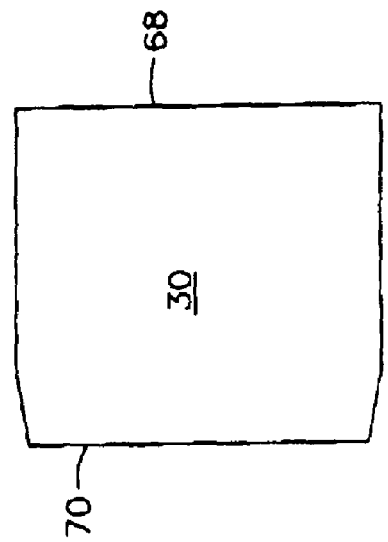
FIG. 4 is a plan view of the retainer body cover portion of the liquid-tight connector of the present invention.

Referring to FIG. 4, a plan view of the retainer body cover 30 depicts the cover 30 having a leading end 68 that will face the tubular body (not shown in FIG. 4) when the liquid-tight connector is assembled and a trailing end 70 that will face outward from the connector (not shown in FIG. 4).

Figure 3:
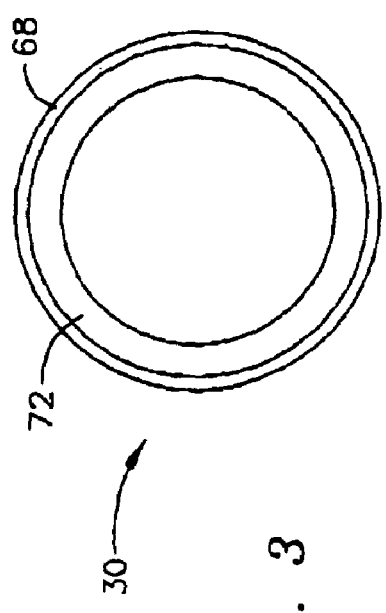
FIG. 3 is an end view of the retainer body cover as viewed from the right side of FIG. 4.

As shown in FIG. 3, an end view of the retainer body cover 30 as viewed from the leading end 68, the trailing end includes a lip 72 that will bear against the retainer body (not shown) when the connector is assembled and secure the retainer body to the tubular body.

Figure 5:
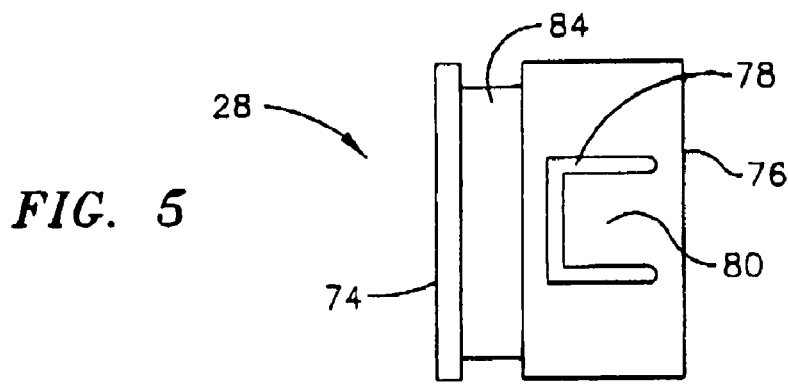
FIG. 5 is a plan view of the retainer body of the liquid-tight connector of the present invention.
Figure 6:
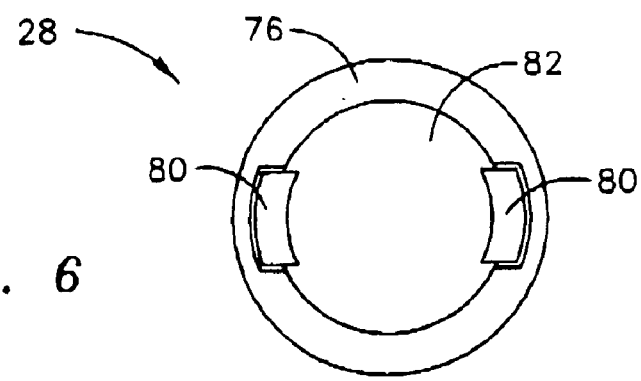
FIG. 6 is an end view of the retainer body as viewed from the right side of FIG. 5.

Referring now to FIGS. 5 and 6, the retainer body 28 includes a leading end 74 that will face the tubular body and a trailing end 76. U-shaped cuts 78 on the outer periphery of the retainer body 28 define inward and forward extending conduit tangs 80 that extend into the central bore 82 of the tubular retainer body 28. The retainer body 28 includes a necked-down portion 84 near the leading end 74. The inward and forward extending conduit tangs 80 extend into the central bore 82 of the retainer body 28 from U-shaped cuts 78 in the wall 86 of the retainer body.

Figure 7:
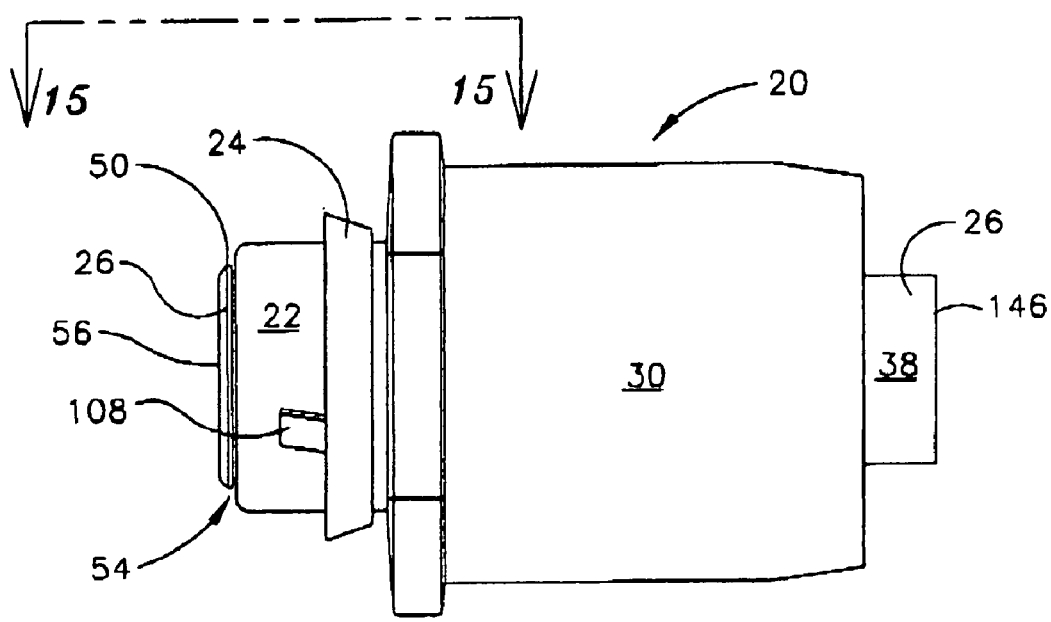
FIG. 7 is a plan view of the preferred embodiment of the present invention, a liquid-tight connector consisting of an assemblage of the five separate portions.

Referring to FIG. 7, a plan view is presented of the preferred embodiment of the present invention, a liquid-tight connector 20 consisting of an assemblage of the five separate portions including the snap ring 22, sealing ring 24, tubular body 26, retainer body cover 30, and retainer body (covered by retainer body cover and therefore not in view in FIG. 7). The trailing end 146 of the connector 20, depicted on the right side of FIG. 7, shows the end of the ferrule 38 extending from the retainer body cover 30. Grounding tangs 120 on the snap ring 22 restrain the sealing ring 24 on the nose portion 50 of the tubular body 26. Inward bent locking tabs (not shown in FIG. 7) fit into the depression 54 located near the leading edge 56 of the nose portion 50 and thereby secure the snap ring 22 to the tubular body 26. The sealing ring 24 is held on the nose portion 50 of the connector 20 by the grounding tangs 120.

Figure 8:
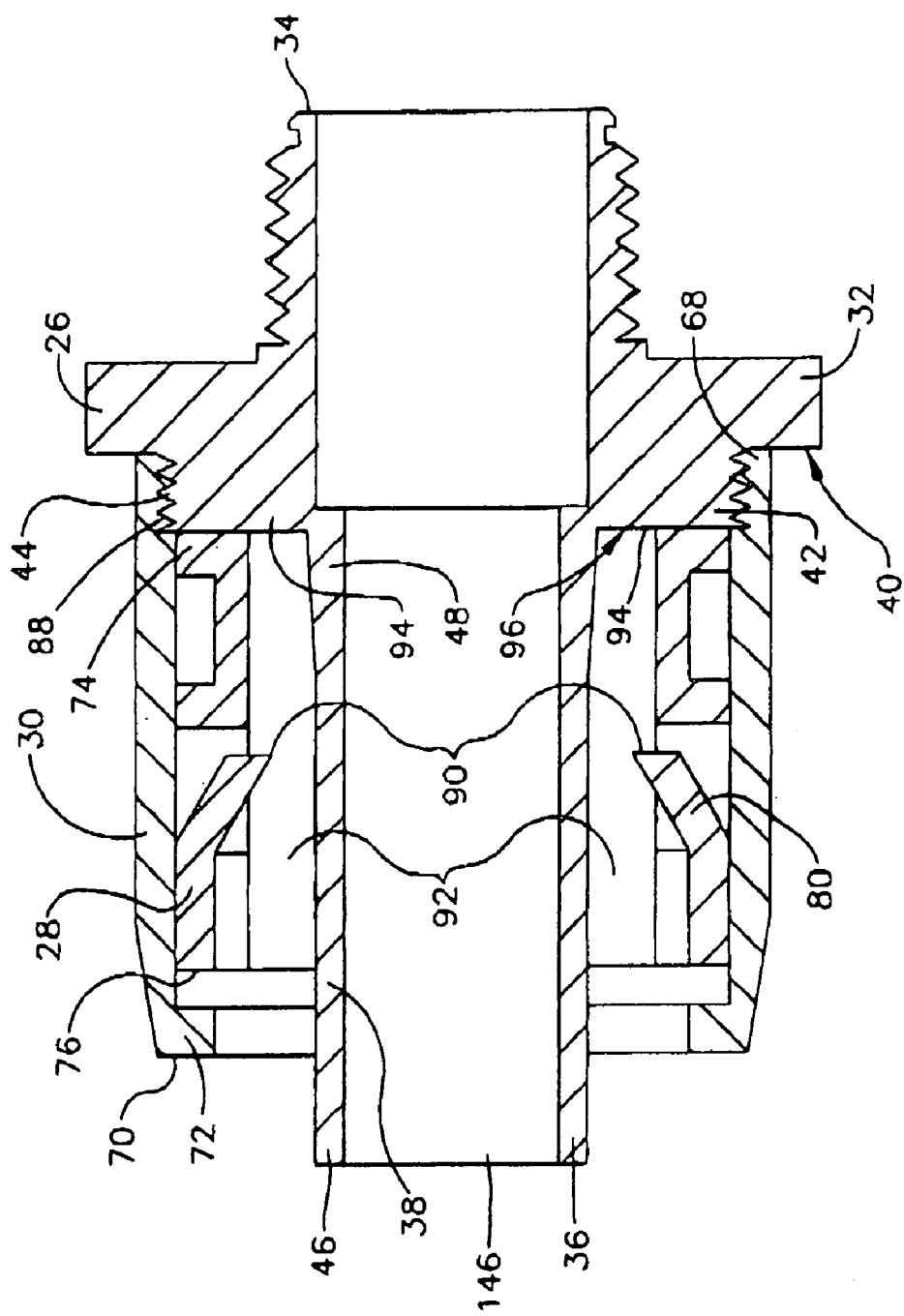
FIG. 8 is a sectional view of the assembled retainer body cover, retainer body, and tubular body of the present invention.

The interaction of three of the various pieces that form the preferred embodiment of the present invention are better understood by referring to the sectional view of the partially assembled liquid-tight connector shown in FIG. 8. Depicted in this drawing are the assembled retainer body cover 30, retainer body 28, and tubular body 26. To assemble these components, the retainer body 28 is positioned over the ferrule 38 of the tubular body 26 until the leading end 74 of the retainer body 28 contacts the trailing wall 96 of the shoulder 42. The retainer body cover 30, including interior threads 88 on its leading end 74, slides over the trailing end 76 of the retainer body 28 and is screwed onto the threads 44 on the shoulder 42 of the tubular body 26 until the leading end 68 of the retainer body cover 30 contacts the trailing wall 40 of the flange 32. After the retainer body cover 30 is tightened on the shoulder 42 in this manner, the retainer body 28 is held concentrically around the ferrule 38 portion of the tubular body 26 as shown in FIG. 8 and the lip 72 at the trailing end 70 of the retainer body cover 30 holds the retainer body 28 within the retainer body cover 30. The inward and forward extending conduit tangs 80 of the retainer body 28 include free ends 90 that are oriented toward the trailing wall 40 of the flange 32. As shown in this cross-sectional view, the ferrule 38 gradually tapers upward in thickness from its end 46 toward its base 48. A conduit-accepting channel 92 is created between the inner circumference of the retainer body 28 and the outer circumference of the ferrule 38. The channel 92 is open at the trailing end 36 of the tubular body 26 and is sized to accept a given trade size of conduit (not shown in FIG. 8). The inner extent of the channel includes a seat 94 defined by a portion of the trailing wall 96 of the shoulder 42.

With reference to FIG. 9, there is shown a plan view of the blank 100 used to form the snap ring. The blank 100 is typically stamped from a thin piece of spring steel, such as 1050 spring steel or equivalent, preferably approximately 0.020 inches in thickness plus a zinc plating of 0.00015 inches thick but may be 0.013 to 0.023 inches in thickness. The blank 100 has a tongue 102 on one end and a groove 104 on the opposite end. U-shaped openings 106 in the blank 100 define snap locking tangs 108 that are lanced from the body of the blank. The U-shaped openings 106 have relatively wide slots 110 on each side of the tangs and a slot or shear line 112 at the bottom of the U-shape. The blank 100 includes two edges 114e, 116e, which will become the leading 114 and trailing 116 ends of the snap ring after the blank 100 is formed into its annular shape. The snap locking tangs 108 are bent outwardly and toward the trailing edge 116e. Two slits or narrow openings 118 in blank 100 adjacent the trailing edge 116e define grounding tangs 120 that will be bent outward and toward the trailing edge 116e. The flat front surface of blank 100 shown in FIG. 9 will become the outer circumference 122 when it is formed into the annular-shaped snap ring. One or more locking tabs 124, creating a series of locking tab segments 128, are typically formed in the leading edge 114e of the blank as shown. One continuous locking tab may be formed along the leading edge of the blank, if desired, in lieu of a series of locking tab segments.

Figure 14:
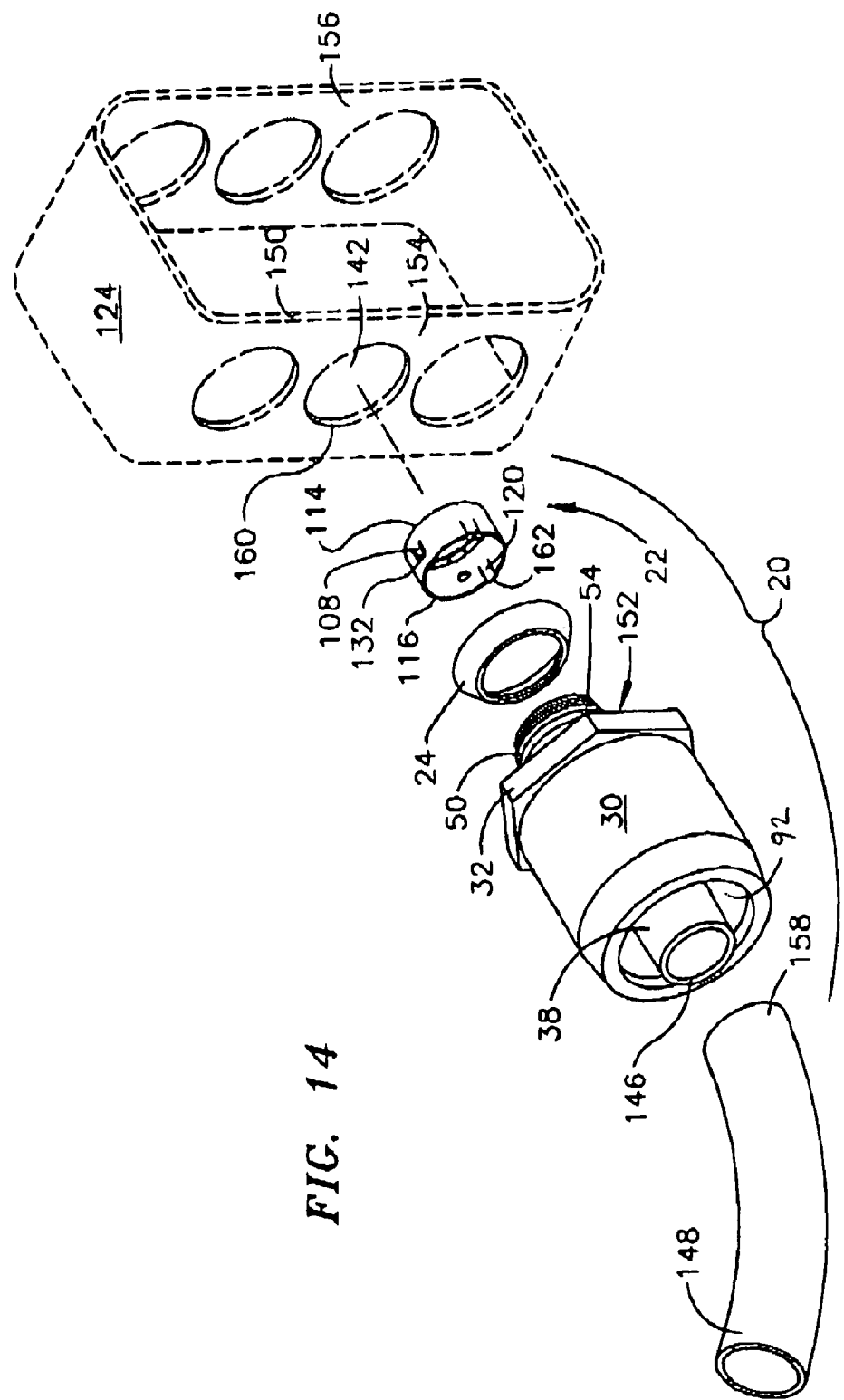
FIG. 14 is a perspective view showing the manner in which the various portions of the liquid-tight connector of the present invention are oriented and aligned prior to connection to a junction box.

With reference to FIGS. 9 and 14, after the snap ring blank is formed into its annular shape, edge 114e becomes the leading end 114 of the annular-shaped snap ring 22 facing into the interior of a junction box and edge 116e becomes the trailing end 116 facing away from the interior of the junction box.

FIG. 10 depicts an end view of blank 100 after it has been formed into a circle or annular shape. Snap locking tangs 108 are angled outwardly and trailingly from face 126. The grounding tangs 120 are angled outwardly and trailingly. The locking tab segments 128 are bent inward at approximately right angles to the outer circumference.

FIG. 11 depicts a cross section of the snap ring 22 taken along lines 11—11 of FIG. 10 with the snap locking tangs and grounding tangs omitted. As shown in FIGS. 10 and 12, the locking tab 124 may be segmented into individual locking tab segments 128 with the space 130 between segments partly closed when bent into a locking tab 124.

When blank 100 is formed into an annular shape, tongue 102 loosely fits into groove 104. The blank formed into an annular snap ring 22 is depicted in FIGS. 10 and 12. Usually, the spring steel is heat treated after the forming operation so that the steel will have the correct properties and so that it will hold the annular shape. The blank 100 for a ½ inch trade size is approximately 0.548 inches wide and 2.750 inches long prior to being formed in the annular shape. Snap locking tangs 108 with outer or abutment edges 132 extend and are angled outwardly and trailingly from the outer circumference 122 of the snap ring 22 and are located preferably at approximately 180 degrees from each other.

The snap locking tangs form an outermost diameter of approximately 1.0 inch for a ½ trade size connector. Except when specifically indicated otherwise herein, all dimensions are with reference to a ½-inch trade size fitting.

The locking tab 124 extends inwardly from the inner circumference 134 at the approximate angle shown which is approximately a right angle to form an inner diameter of approximately 0.605 inch as measured at the inner edge 136 of the locking tab 124.

Figure 15:
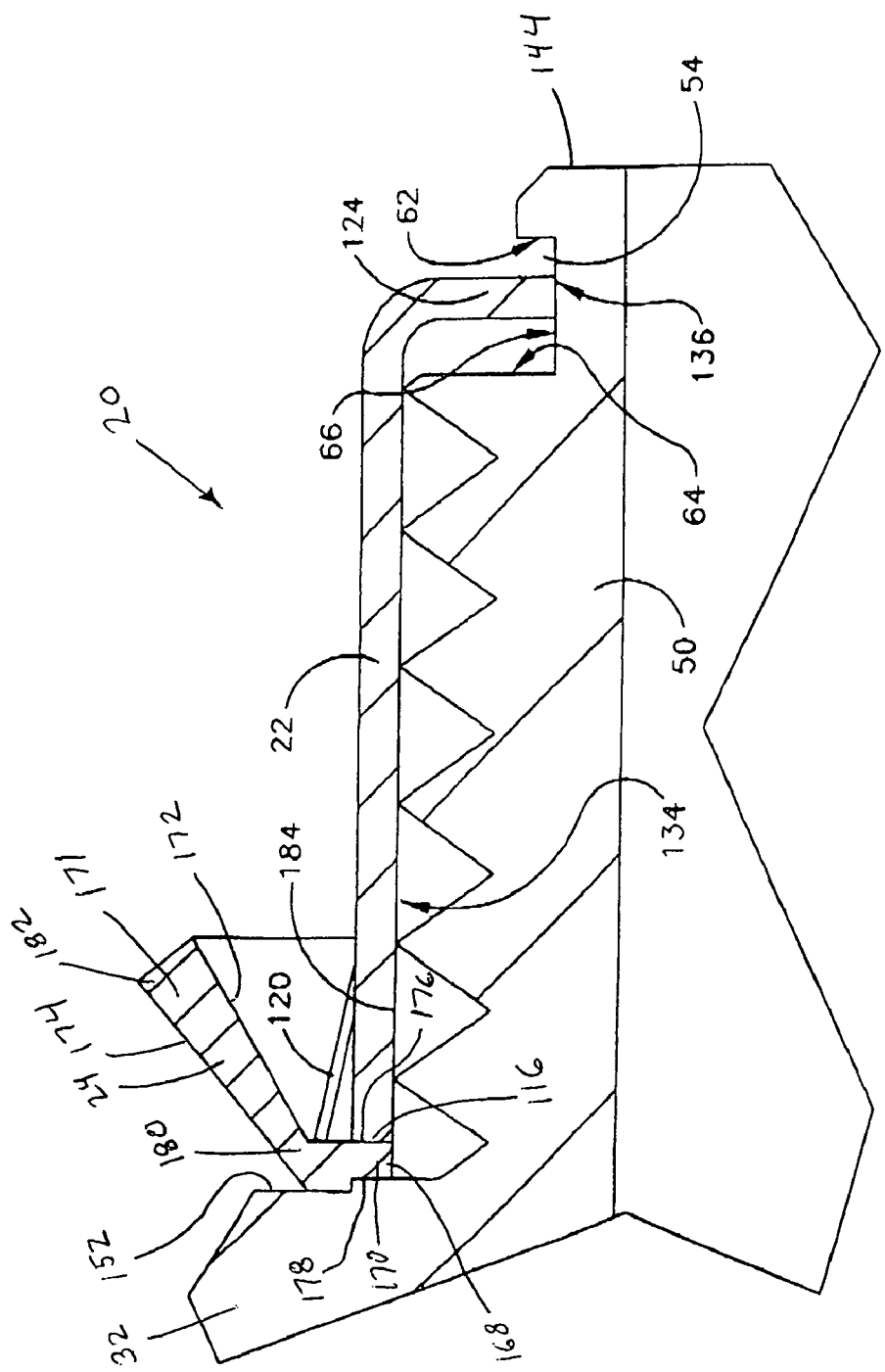
FIG. 15 is a sectional view of the leading end of the liquid-tight connector taken on section 15—15 of FIG. 7.

Referring to FIG. 15, the inner edge 136 of locking tab 124 drops into the depression 54 so that the inner edge 136 contacts the bottom 66 of the depression. The depression 54 has a leading wall 62 and a trailing side wall 64 with the depression being approximately 0.060 inch wide and is approximately 0.055 inch deep. The depression 54 is near the leading end 144 of the connector 20 and is preferably spaced approximately 0.110 inch from the end. This prevents the snap ring 22 from linear leading movement with respect to the connector thus. The snap ring 22 is therefore locked onto the connector unless the locking tab 124 is raised out of the depression 54 by an installer's fingers or by the use of a simple prying tool, such as a screwdriver.

As seen in FIGS. 10 and 12, the number of individual segments 128 in the preferred embodiment of the snap ring 22 is 12. The segments 128 extend circumferentially approximately 270° with an area 138 free of segments extending over the area covered by the tongue 102 and groove 104.

Details of the sealing ring 24 are shown in the plan view of FIG. 17 and the cross-sectional view of FIG. 18. The annular-shaped sealing ring 24 has an outer edge 166 and an inner edge 168 with a base portion 170 adjacent to the inner edge and an outer portion 171 extending from the base portion 170. As shown in the cross-sectional view of FIG. 18, the sealing ring 24 is shaped somewhat like a saucer, with the base portion 170 in a flat plane and the outer periphery extending at an approximate 50° angle from the base. The cross-sectional view also shows the various sealing surfaces on the sealing ring 24 including a leading sealing face 172 and a trailing sealing face 174 on the outer portion 171 and a leading sealing face 176 and a trailing sealing face 178 on the base portion 170. The base thickness, designated by reference numeral 180, is not as thick as the outer perimeter 182. As shown in the cross-sectional view of FIG. 18, the sealing ring 24 increases in thickness 180 from the base portion 170 to the thickness 182 at the outer portion 171.

To understand the operation of the present invention, refer to FIG. 14, which is a perspective view showing the manner in which the various portions of the liquid-tight connector 20 are oriented and aligned prior to connection to a junction box 140. Although FIG. 14 depicts the sealing ring 24 and snap ring 22 exploded away from the main body of the connector 20, typically the connector would be supplied in one piece with the five separate portions assembled. The user would have the option of applying the assembled connector 20 to a smooth access or knock-out hole 142 as shown, or could install the connector to a threaded access hole (not shown) by removing the snap ring 22 and screwing the connector 20 with the externally threaded nose portion 50 into the internal threads of the threaded access hole. In either case, the sealing ring 24 is used to achieve a liquid-tight fit between the connector 20 and the box 140. If the snap ring 22 is removed for connection to a threaded access hole, the snap ring is removed and the sealing ring 24 retained. If the connector 20 is connected to a box at a knockout aperture as shown, the snap ring 22 is retained on the nose portion 50 and the grounding tangs 120 hold the sealing ring 24 in place. The snap ring 22 is held on the nose portion 50 of the connector 20 by the locking tab segments 128 extending into the depression 54 on the leading end 144 of the connector.

Referring to FIG. 14, as the connector 20 and snap ring 22 are pushed into the access hole or knock-out 142, the snap locking tangs 108 are forced inward toward the central axis 164 of the annular snap ring 22. The spring steel material of construction of the snap ring 22 allows the snap locking tangs 108 to flex inwardly toward the central axis 164. When the snap ring 22 is advanced sufficiently into the access hole 142, the snap locking tangs 108 spring outward as their abutment edges 132 pass completely through the electrical junction box wall 150. As a result, the connector 20 is locked tightly into place on each side of the wall 150 between the leading wall 152 of flange 32 of the connector 20 on one side abutted with the outer surface 154 of the junction box wall 150 and the snap locking tangs 108 abutted with their abutment edges 132 against the inner surface 156 of the junction box wall 150.

Referring to FIG. 13, the trailing end 146 of the connector 20 is assembled by sliding the leading end 74 of the retainer body 28 over the ferrule 38 until it contacts the trailing wall 96 of the shoulder 42. The retainer body cover 30 would then be slid over the retainer body 28 until the interior threads (not visible in FIG. 13) of the retainer body cover 30 contacted the exterior threads 44 on the shoulder 42 and then screwed onto the shoulder 42 until the leading end 68 of the cover 30 is tightened against the trailing wall 40 of the flange. The leading end 34 of the tubular body 26 will become the leading end 144 of the connector after the separate pieces are assembled. The connector is assembled by sliding the sealing ring 24 over the nose portion 50 of the tubular body 26 and pushing the snap ring 22 onto the nose portion 50 until the locking tabs 124 (not shown) of the snap ring 22 snap into the depression 54. Once tightened onto the nose portion 50, the snap ring 22 would extend nearly to the leading wall 152 of the flange 32 and the grounding tangs 120 of the snap ring 22 would hold the sealing ring 24 against the leading wall 152 of the flange 32.

To put the liquid-tight connector 20 of the present invention into service, the connector 20 would be provided with the five separate pieces, as shown in FIG. 13, completely assembled, as shown in FIG. 7 (retainer body obscured by retainer body cover and therefore not visible).

Referring to FIG. 14, once assembled, to operate the present invention, the liquid-tight connector 20 is typically connected to a panel or junction box 140 by simply grasping a conduit 148 of the proper trade size, inserting it into the channel 92 on the trailing end 146 of the connector 20, and pushing the conduit 148 into the channel 92 until the end 158 of the conduit 148 is pushed flush against the seat (not visible in FIG. 14) at the end of the channel. After the conduit 148 is secured to the connector 20, the leading end 144 of the connector 20 is pushed into the access hole 142 of a junction box 140 until the snap locking tangs 108 clear the wall 150 of the junction box 140. The snap ring 22 is constructed of a resilient material such as spring steel and the snap locking tangs 108 are oriented, in their unbiased position, outward and trailingly from the outer periphery of the ring 22. As the snap locking tangs 108 enter the access hole 142 they are compressed inwardly. Further advancement of the snap ring 22 into the access hole 142 eventually causes the snap locking tangs 108 to clear the wall 150 of the junction box 140 at which point the snap locking tangs 108 will snap back to their unbiased position. The snap locking tangs 108 then hold the connector 20 securely to the junction box 140. Therefore, the liquid-tight connector of the present invention is very easy to install compared to prior art connectors, as no hand or tool tightening of nuts on the leading end or compression nuts on the trailing end is required to achieve good continuity and a liquid-tight fit. As shown by the above description, all that is required to install the present invention is to push the conduit firmly into the channel on the trailing end of the connector and then push the leading end of the connector into a knockout hole until the snap locking tangs 108 pass the inner wall of the junction box and snap outward.

When installed in a junction box, as simulated in FIG. 14, the leading edge 114 of the snap ring 22 will reside inside the junction box 140, and the outer or trailing edge 116 is within the confines or side walls 160 of the access hole 142. The grounding tangs 120 extend outward approximately 0.052 inches and are forced inward by the inside wall of access hole 142 so that the trailing grounding edge 162 of the grounding tangs make firm contact within the side walls of the access hole 142. Thus, the side walls 160 serve to encircle the trailing edge 116 to assist in keeping the annular snap ring 22 from expanding outward. The connector is highly resistive to pull out forces when the connector 20 and snap ring 22 are locked in place.

The water tight sealing nature on the trailing end of the connector is best explained by referring to the sectional view of the assembled tubular body 26, retainer body 28, and retainer body cover 30 shown in FIG. 8. The conduit-accepting channel 92 resides at the trailing end 36 of the tubular body 26 between the inner circumference of the retainer body 28 and the outer circumference of the ferule 38 and is sized to accept a given trade size of conduit (not shown in FIG. 8). To install the connector, an installer would simply insert the proper trade size of conduit into the conduit-accepting channel 92 and push it therein. As the conduit advances from the end 46 to the base 48 of the ferrule 38, the conduit envelops the ferrule 38 and forces the inward and forward extending conduit tangs 80 outward. Since the conduit tangs 80 are pressured inward by the retainer body cover 30, the sharp free ends 30 of the conduit tangs 80 dig into the surface of the conduit and prevent it from being withdrawn. As the conduit advances farther into the conduit-accepting channel 92, the end of the conduit (not shown in FIG. 8) is pushed onto the base 48 of the ferrule 38 and the conduit is spread radially outward by the wider taper of the base 48. Eventually the conduit is advanced to the end of the channel 92 where the end of the conduit contacts the seat 94. The conduit is prevented from being withdrawn by the inward and forward extending conduit tangs 80 with the free end 90 of each tang digging into the surface of the conduit (not shown in FIG. 8). At its full insertion into the conduit-accepting channel 92 the inner circumference of the conduit is held tightly on its inside by the wider taper of the base 48 of the ferrule 38, the end of the conduit is sealed tightly against the seat 94, and the outer periphery of the end of the conduit is sealed by the inner periphery of the retainer body 28. A water or liquid tight seal is therefore established between the trailing end 146 of the connector and the conduit.

Referring to FIG. 14, after the conduit 148 has been inserted fully into the conduit-accepting channel 92 to create a water tight seal on the trailing end 146 of the connector 20, the leading end 144 of the connector may be secured to a junction box 140 or panel. The sealing ring 24 is held against the leading wall 152 of the flange 32 by the grounding tangs 120 on the snap ring 22. The leading end 144 of the connector 20 is simply pushed into an access hole 142 of a panel or a junction box 140, as depicted in FIG. 14. The snap ring 22, being of a lesser diameter than the access hole 142, will easily enter the aperture. As the snap ring 22 is constructed of a resilient material, the snap locking tangs 108, extending to a wider diameter than the access hole 142, are depressed as they enter the aperture. Once they have cleared the wall 150 of the junction box 140, the snap locking tangs 108 snap outwardly to their unbiased position, thereby locking the leading end 144 of the connector 20 against the junction box 140. When the leading end 144 of the connector 20 is inserted into the access hole 142, the sealing ring 24 is compressed and forced into the open portion between the access hole 142 and the nose portion 50, thereby sealing the leading end 144 of the connector 20 and creating a water tight seal. When connected completely, with the conduit 148 inserted fully into the channel 92 and the snap locking tangs 108 of the snap ring 22 engaged with the wall 150 of the junction box 140, the sealing ring 24 is forced into the access hole 142 and the connector 20 is water or liquid tight on both its trailing 146 and leading 144 ends.

The sealing capability of the sealing ring 24 can be better understood by referring to FIG. 15, a sectional view of the leading end of the liquid-tight connector taken on section 15—15 of FIG. 7. As shown in FIG. 15, after the snap ring 22 is snapped onto the nose portion 50, the grounding tangs 120 of the snap ring 22 hold the sealing ring 24 in place with the trailing end 116 of the snap ring compressing the inner edge 168 of the base portion 170 of the sealing ring and also working in conjunction with the grounding tangs 120 to hold the sealing ring 24 in place. When the leading end 144 of the connector is pushed into an aperture in a panel (not shown), the sealing ring 24 is compressed between the leading wall 152 of the flange 32 and the outer face (not shown) of the panel. A water-tight seal is created between several surfaces, including the leading face 176 of the base portion 170 of the sealing ring 24 against the trailing end 116 of the snap ring 22, the trailing face 178 of the base portion 170 of the sealing ring 24 against the leading wall 152 of the flange 32, the leading face 172 of the outer portion 171 of the sealing ring 24 against the outer wall of the panel (not shown), and the trailing face 174 of the outer portion 171 of the sealing ring 24 against the leading wall 152 of the flange 32. The design of the sealing ring 24, including the differing thickness between the base thickness 180 and outer thickness 182, is critical to achieving a water-tight seal at the leading end 144 of the connector. The larger thickness 182 at the outer portion 171 allows the sealing ring 24 to form a tight seal at the outer portion 171 of the sealing ring 24 and thereby creating a liquid-tight seal near the outer periphery of the connector after it is attached to the panel. The smaller thickness 180 at the base portion 170 allows the sealing ring 24 to form an additional seal at the inner periphery 168 of the sealing ring 24. The design of the sealing ring and its material of construction therefore contribute to an excellent liquid-tight fit at the juncture of the connector and the junction box or panel.

Conduit is offered in various trades sizes, such as ¼", ½", ¾", etc. Underwriters' Labs has created standards for these trade sizes including specifications for the outer and inner diameters of the various trade sizes. Therefore, the preferred embodiment of the liquid-tight connector of the present disclosure can be constructed for any trade size of conduit by sizing the conduit-accepting channel 92, as shown in FIG. 8, to handle the desired trade size conduit. The liquid-tight connector can therefore be constructed for ¼", ½", ¾", or any other trade size conduit. The nose portion 50, snap ring 22, and sealing ring 24 can likewise be constructed of any desired size to enable rapid snap-in connection of the leading end 144 of the connector 20 to any trade size of access hole 142.

Referring again to FIG. 13, the pieces of the connector assembly 20 are, from left to right in FIG. 13, the snap ring 22, the sealing ring 24, the tubular body 26, the retainer body 28, and the retainer body cover 30. The snap ring 22 is typically constructed of spring steel but may be constructed of any resilient metal or plastic. The sealing ring 24 is typically constructed of Santoprene™, which is a trademark of Advanced Elastomer Systems, L.P., but may be constructed of any similar thermoplastic elastomer. Additionally, it may be preferable to construct the sealing ring 24 of a flame retardant grade of thermoplastic elastomer to meet Underwriters Laboratories flame retardant requirements, such as grades UL 94 V-0 or UL 94 HB. The tubular body is preferably constructed of nylon, polycarbonate, or PVC for non-metallic conduit. If the connector were constructed for metallic conduit, the tubular body would typically be constructed of zinc, or a similar metal to enable the connector to establish electrical continuity between the metallic conduit and the panel or junction box. The retainer body 28 and the retainer body cover 30 could be constructed of any appropriate metal or plastic, but preferably would be constructed of polycarbonate, nylon, or PVC.

The outer diameter of the annular snap lock ring 22 in its relaxed or unbiased shape, as best shown in FIG. 10, is preferably circular and, as measured from its outer surface 122, is approximately 0.845 inches in diameter for ½-inch nominal trade size threads. The dimensions of the snap ring 22 mentioned herein are for use with a threaded connector having ½ inch NPS (National Pipe Straight) or NPT (National Pipe Taper) trade size thread.

The nominal knockout or access hole for an electrical junction box is 0.875 inches in diameter. Usually the manufacture provides an opening 0.870 to 0.880 inches in diameter. However, the access hole can be as small as 0.859 inches in diameter (including tolerances).

The snap ring could be constructed for other standard trade size threads by scaling these dimensions including truncating appropriate to the nominal trade sizes such as for nominal trade sizes ¾ inch or 1 inch.

The nominal major diameter of the threads 58 on the outer circumference of the nose portion 50 is normally approximately 0.805 to 0.808 inches, but the threads can be truncated to an approximate major diameter of 0.795 inch. This leaves sufficient space between the major truncated diameter and the minimum diameter of 0.859 inches for the access hole to accommodate the thickness of the wall of the snap ring.

The tongue 102 and groove 104, as best seen in FIG. 12, are designed so that there is a minimum fit between the tongue and groove from side to side and the groove and tongue are generally rectangular in shape and not tapered. This helps to prevent the snap locking or snap ring 22 from being entangled when a number of them are in loose fashion prior to assembly.

A surface of a leading end portion being tapered from a small diameter at the leading edge is 0.600 inch to a larger diameter is 0.720 inch at a side wall near said leading edge, an outer diameter of a leading end portion of a tubular body is 0.790 to 0.810 inch for a ½-inch nominal trade size fitting, a depression is from 0.023 to 0.060 inch wide and 0.010 to 0.055 inch deep as measured from minor thread diameter of a nominal trade size threads, a leading end portion has an outer diameter of 0.805 to 0.808 inch, a depression is from 0.023 to 0.060 inch wide and 0.010 to 0.055 inch deep as measured from said outer periphery of a leading end portion, a locking tab extends 0.057 to 0.122 inch from an outer diameter of an annular-shaped snap ring, a snap ring is constructed of spring steel with a thickness of 0.013 to 0.023 inch and more preferably with a thickness of 0.017 to 0.023 inch, the outer diameter of an annular-shaped snap ring is 0.805 to 0.860 inch for a ½-inch nominal trade size fitting, an inner diameter of an annular-shaped snap ring is 0.805 to 0.810 inch for a ½-inch nominal trade size fitting, each of grounding tangs in their unbiased states extend 0.015 to 0.060 inch beyond the outer diameter of a snap ring for a ½-inch nominal trade size fitting, nominal trade size threads include a major diameter of 0.805 to 0.808 inch, a pitch diameter of 0.751 to 0.754 inch, and a minor diameter of 0.710 to 0.713 inch for a ½-inch nominal trade size fitting, and an outer diameter measured across grounding tangs is 0.865 to 0.965 inch for a ½-inch nominal trade size fitting.

Figure 16:
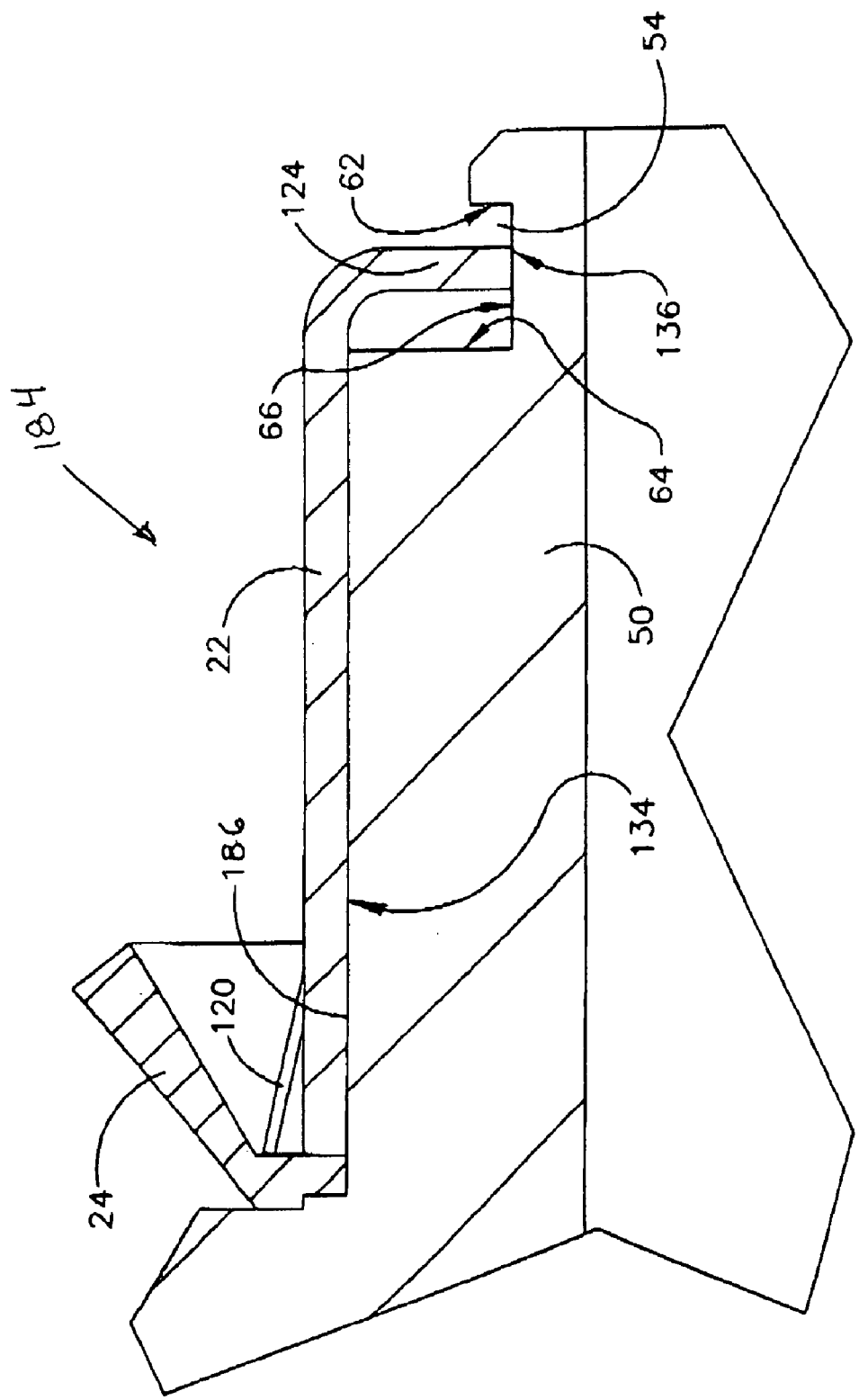
FIG. 16 is a sectional view of the leading end of an alternative embodiment of the liquid-tight connector having a smooth nose portion on the tubular body.

Referring to FIG. 16, a sectional view is shown of an alternative embodiment of the leading end 144 of a liquid-tight connector 184 having a smooth outer periphery 186 on the nose portion 50 of the tubular body 26. The snap ring 22 is secured on the smooth outer periphery 186 of the nose portion 50 by first simply placing the snap ring 22 over the smaller diameter leading edge 56 of the nose portion 50. The ring 22 can then be spread slightly by grasping the tongue 102 and groove 104 and pulling apart. The snap ring 22 will then easily slip over the leading edge 56 whereupon the locking tabs 124 snap into the depression 54 on the outer periphery of the smooth-bodied nose portion 50. The smooth-bodied embodiment of the liquid-tight connector 184 therefore provides a connector designed specifically for engaging non-threaded apertures in a junction box. As threads are not required on the outer periphery of the nose portion 50, the smooth-bodied embodiment of the connector 184 provides a cheaper alternative for rapidly creating a liquid-tight fit between a conduit and a panel or junction box. This embodiment however does not provide the flexibility of being able to remove the snap ring 22 and screw into a threaded access hole.

As seen in FIGS. 10 and 12, the number of individual segments 128 in the preferred embodiment of the snap ring 22 is 12. The segments 128 extend circumferentially approximately 270° with an area 138 free of segments extending over the area covered by the tongue 102 and groove 104.

Thus, the invention defines a versatile threaded snap in connector that is readily utilized by electricians to connect cable and electrical tubing to electrical junction boxes with the easily applied snap in feature for connection to an electrical junction box; but, at the same time can be utilized to make the connection by lock nut or by threaded access holes. To expose the threads for the threaded connection, it is only necessary to remove the snap ring. Because of this arrangement, the electrician can minimize his variety of connectors for a job.

As used herein the terms relating to right angles and inclined inward are in reference to an axis through the longitudinal center of the connector. Various references herein such as bent inward and so forth are with reference to the longitudinal axis of the snap ring or the connector as the case may be. Bent inward implies that the tang or other part is bent toward the central longitudinal axis. The tangs may also be referred herein as facing forward or trailingly. A forward bent tang is oriented such that its free end is pointed toward the leading end of the connector or piece. A tang bent trailingly is oriented with the free end of the tang pointing toward the trailing end of the connector piece.

Although the description above contains many specific descriptions and proposed sizes, these should not be construed as limiting the scope of the invention but as merely providing illustrations of a preferred embodiment of the liquid-tight connector of this disclosure. Typical sizes are provided to illustrate a given embodiment of the present invention and should not be construed as limiting its scope.

Thus the scope of the invention should be determined by the appended claims and their legal equivalents, rather than by the specific examples given.

What is claimed is:

1. A liquid-tight connector comprising:
a tubular body including a leading and a trailing end;
said tubular body including a central flange having a leading and a trailing wall;
a ferrule extending from said trailing wall, said ferrule including a smooth exterior surface;
a tubular nose portion extending from said leading wall, said nose portion including an outer periphery;
a depression around the outer periphery of said nose portion;
a sealing ring disposed on said nose portion adjacent said leading wall;
a fastener secured to said nose portion, said fastener securing said sealing ring against said leading wall, said fastener capable of engaging and securing said nose portion to an aperture in a panel in a manner that said sealing ring is compressed and deformed so that the area between said nose portion and said aperture is filled with said sealing ring thereby creating a water tight seal between said nose portion and said panel;
a tubular retainer body extending from and secured to said trailing wall, said retainer body concentric with and of a greater diameter than said ferrule, said retainer body including inward directed tangs extending within the inner periphery of said retainer body with the free ends of said inward directed tangs oriented toward said leading end of said tubular body; and
a conduit-accepting channel defined as the area between said ferrule and said retainer body, said channel capable of accepting a metallic or non-metallic conduit and creating a water-tight seal between said conduit and said ferrule.

2. The liquid-tight connector of claim 1 wherein said fastener is a snap ring which includes:
a tubular portion having a leading and a trailing end;
one or more grounding tangs extending outwardly toward said trailing end of said tubular portion;
one or more locking tabs extending inwardly from said tubular portion into said depression to secure said snap ring to said tubular nose portion; and
one or more snap locking tangs extending outwardly from said tubular portion to resist said connector being pulled from a panel when connected thereto.

3. A liquid-tight connector comprising:
a tubular body including a leading and a trailing end;
said tubular body including a central flange having a leading and a trailing wall;
a ferrule extending from said trailing wall, said ferrule including a smooth exterior surface;
a tubular nose portion extending from said leading wall, said nose portion including an outer periphery;
threads on said outer periphery of said nose portion;
a tubular retainer body extending from and secured to said trailing wall, said retainer body concentric with and of a greater diameter than said ferrule, said retainer body having a trailing end and an inner periphery;
inward directed tangs on said retainer body extending from said inner periphery with the free ends of said inward directed tangs oriented toward said leading end of said tubular body;
a retainer body cover securing said tubular retainer body to said trailing wall;
said retainer body cover including a non-inclined contact surface engaging said trailing end of said tubular retainer body; and
a conduit-accepting channel defined as the area between said ferrule and said retainer body, said channel capable of accepting a metallic or non-metallic conduit and creating a water-tight seal between the interior surface of said conduit and said smooth exterior surface of said ferrule.

* * * * *